United States Patent
Care et al.

(10) Patent No.: US 10,161,419 B2
(45) Date of Patent: Dec. 25, 2018

(54) FAN CASING ASSEMBLY

(71) Applicant: ROLLS-ROYCE plc, London (GB)

(72) Inventors: Ian C D Care, Derby (GB); Dale E Evans, Derby (GB)

(73) Assignee: ROLLS-ROYCE plc, London (GB)

( * ) Notice: Subject to any disclaimer, the term of this patent is extended or adjusted under 35 U.S.C. 154(b) by 415 days.

(21) Appl. No.: 15/151,136

(22) Filed: May 10, 2016

(65) Prior Publication Data

US 2016/0363135 A1    Dec. 15, 2016

(30) Foreign Application Priority Data

Jun. 9, 2015  (GB) .................................. 1509987.2

(51) Int. Cl.
| | |
|---|---|
| *F04D 29/66* | (2006.01) |
| *F04D 29/02* | (2006.01) |
| *F04D 29/32* | (2006.01) |
| *F04D 29/38* | (2006.01) |
| *F04D 29/52* | (2006.01) |

(Continued)

(52) U.S. Cl.
CPC .......... *F04D 29/662* (2013.01); *F01D 21/045* (2013.01); *F01D 25/24* (2013.01); *F04D 29/023* (2013.01); *F04D 29/325* (2013.01); *F04D 29/38* (2013.01); *F04D 29/526* (2013.01); *F04D 29/703* (2013.01); *F05D 2220/32* (2013.01);

(Continued)

(58) Field of Classification Search
CPC ...... F01D 21/045; F01D 25/24; F04D 29/662; F04D 29/38; F04D 29/703; F04D 29/325; F04D 29/526; F04D 29/023; Y02T 50/672; F05D 2250/41; F05D 2220/36; F05D 2220/32
See application file for complete search history.

(56) References Cited

U.S. PATENT DOCUMENTS

| | | | | |
|---|---|---|---|---|
| 1,424,242 A | * | 8/1922 | Flanders ................. | F01D 11/02 277/415 |
| 2,507,079 A | * | 5/1950 | Zimmerman ........... | F01D 11/12 415/121.3 |

(Continued)

FOREIGN PATENT DOCUMENTS

| | | |
|---|---|---|
| GB | 1466385 A | 3/1977 |
| GB | 2404953 A | 2/2005 |

(Continued)

OTHER PUBLICATIONS

Nov. 30, 2015 Search Report issued in Great Britain Patent Application No. 1509987.2.

*Primary Examiner* — Dwayne J White
*Assistant Examiner* — Adam W Brown
(74) *Attorney, Agent, or Firm* — Oliff PLC

(57) ABSTRACT

A fan casing assembly comprising an annular casing member for circumferentially surrounding a fan, and an annular fan track liner comprising a plurality of circumferentially adjacent liner panels. The annular fan track liner is positioned radially inward of the annular casing member. A tilting arrangement is provided and configured to selectively circumferentially tilt one or more of the liner panels, such that, in the event of a fan blade being released from a fan, the tilting arrangement can initiate tilting of one or more liner panels so that the liner panels can trim one or more of the remaining fan blades.

14 Claims, 3 Drawing Sheets

(51) Int. Cl.
  *F04D 29/70* (2006.01)
  *F01D 21/04* (2006.01)
  *F01D 25/24* (2006.01)
(52) U.S. Cl.
  CPC ...... *F05D 2220/36* (2013.01); *F05D 2250/41* (2013.01); *Y02T 50/672* (2013.01)

(56) References Cited

U.S. PATENT DOCUMENTS

| | | | |
|---|---|---|---|
| 4,639,188 A | 1/1987 | Swadley | |
| 5,336,044 A | 8/1994 | Forrester | |
| 5,622,472 A | 4/1997 | Glowacki | |
| 6,059,523 A | 5/2000 | Modafferi et al. | |
| 6,227,794 B1 * | 5/2001 | Wojtyczka | F01D 11/122 415/173.4 |
| 6,637,186 B1 * | 10/2003 | Van Duyn | F01D 11/12 415/9 |
| 7,008,173 B2 * | 3/2006 | Gabrys | F01D 21/045 415/9 |
| 7,959,405 B2 * | 6/2011 | Launders | F01D 21/045 415/9 |
| 8,591,172 B2 * | 11/2013 | Bottome | F01D 21/045 415/126 |
| 8,647,049 B2 | 2/2014 | Evans et al. | |
| 9,732,626 B2 * | 8/2017 | Evans | F01D 25/24 |
| 2010/0266384 A1 | 10/2010 | Evans et al. | |
| 2012/0224949 A1 * | 9/2012 | Harper | F01D 21/045 415/9 |
| 2012/0224953 A1 | 9/2012 | Cortequisse | |
| 2013/0136577 A1 * | 5/2013 | Evans | F01D 21/045 415/9 |
| 2013/0336761 A1 * | 12/2013 | Evans | F01D 25/24 415/9 |
| 2016/0169048 A1 * | 6/2016 | Grainger | F01D 25/28 415/213.1 |

FOREIGN PATENT DOCUMENTS

| | | |
|---|---|---|
| GB | 2469447 A | 10/2010 |
| WO | 2012/135638 A1 | 10/2012 |

\* cited by examiner

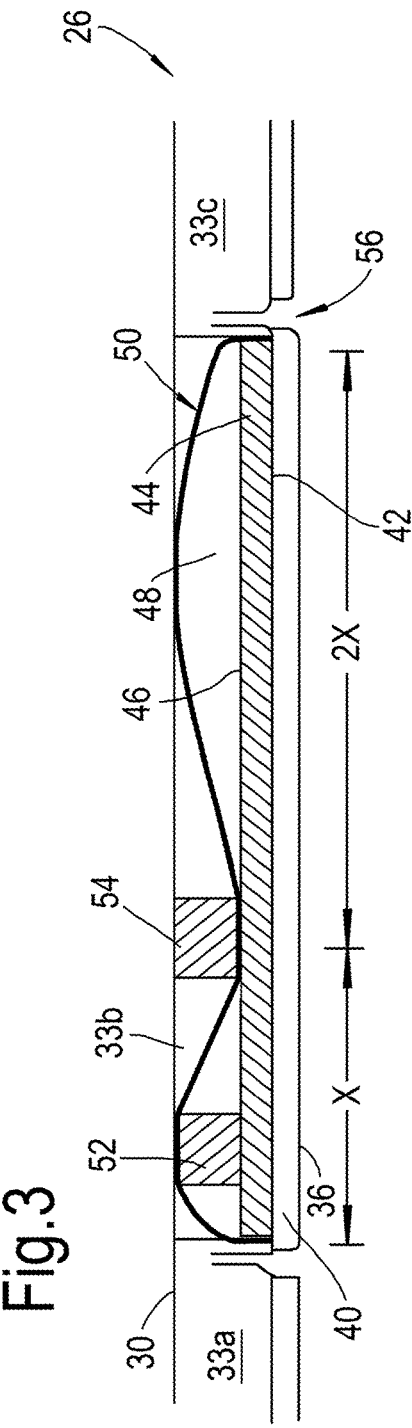
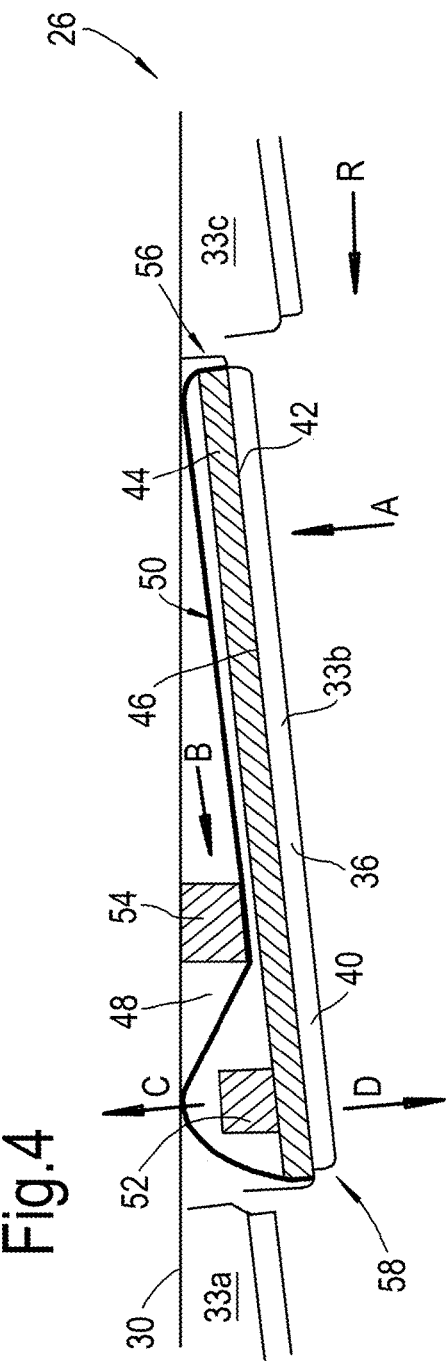

FAN CASING ASSEMBLY

TECHNICAL FIELD

The present disclosure concerns a fan casing assembly, a gas turbine engine and/or a method of trimming blades of a gas turbine engine.

BACKGROUND

Turbofan gas turbine engines (which may be referred to simply as 'turbofans') are typically employed to power aircraft. Turbofans are particularly useful on commercial aircraft where fuel consumption is a primary concern. Typically a turbofan gas turbine engine will comprise an axial fan driven by an engine core. The engine core is generally made up of one or more turbines which drive respective compressors via coaxial shafts. The fan is usually driven directly off an additional lower pressure turbine in the engine core.

The fan comprises an array of radially extending fan blades mounted on a rotor and will usually provide, in current high bypass gas turbine engines, around seventy-five percent of the overall thrust generated by the gas turbine engine. The remaining portion of air from the fan is ingested by the engine core and is further compressed, combusted, accelerated and exhausted through a nozzle. The engine core exhaust mixes with the remaining portion of relatively high-volume, low-velocity air bypassing the engine core through a bypass duct.

The fan is radially surrounded by a fan casing. The fan casing is generally provided with a fan track liner. The fan track liner typically includes an annular layer of abradable material which surrounds the fan blades. During operation of the engine, the fan blades rotate freely within the fan track liner. At maximum speed the blades may cut a path into this abradable layer creating a seal against the fan casing and minimising air leakage around the blade tips during cruise. Further incursions can occur during gusts or take off rotations over time.

If a failure event occurred, a fan blade may be released from the remainder of the fan, and the fan casing and/or fan track liner are arranged so as to prevent the released blade from causing serious damage (that is, the fan casing and/or fan track liner are arranged to contain any high energy debris). The casing and fan track liner may do this in a variety of ways.

If the fan case is metallic, a hook may be provided to arrest forward movement of a released fan blade from the engine. If the fan blades are composite then the blades may break up on impact with the casing, which can ease containment of debris by distributing impact loads. A composite casing without the benefit of a containment hook may be designed to be longer in an axial direction than a metallic casing to cover the blade release trajectory. Such a casing may include features to assist in the break-up of composite fan blades.

Once a fan blade has been released from the remainder of the fan, the fan can become out of balance. An out of balance fan can cause vibrations that increase the risk of damage to the engine and an attached pylon structure and can also affect the pilotability of an aircraft powered by the gas turbine engine.

U.S. Pat. No. 8,647,049 proposes including one or more severance members arranged to trim the tips of the blades of an out of balanced fan. The severance members are provided radially between a gas washed surface of the fan track liner and the casing. When a fan is out of balance the orbit of the fan will change, and this can result in one or more of the blades of the fan being trimmed by the severance member.

SUMMARY OF DISCLOSURE

The present disclosure seeks to provide an arrangement for reducing the out of balance of a fan in the event of a fan blade being released. The disclosure seeks to provide a method of addressing out of balance of a fan without relying on the orbit of an out of balanced fan.

According to a first aspect there is provided a fan casing assembly positionable around a fan having a plurality of blades. The assembly comprises an annular casing member for circumferentially surrounding a fan. An annular fan track liner comprising a plurality of circumferentially adjacent liner panels is positioned radially inward of the annular casing member. A tilting arrangement is provided.

The tilting arrangement is configured to selectively circumferentially tilt one or more of the liner panels.

In the event of a fan blade being released from a fan, the tilting arrangement can initiate tilting of one or more liner panels so that the liner panels can trim one or more of the remaining fan blades.

The tilting arrangement may be configured to selectively circumferentially tilt one or more of the liner panels so as to present a trailing edge of tilted liner panels radially inward (e.g. towards the remaining fan blades so as to trim the remaining fan blades). The tilting arrangement may be configured such that if a blade impacts a leading edge of a panel, the trailing edge of the panel is moved radially inwards.

The tilting arrangement may be configured such that a fan blade impacting one circumferential end of the liner panel (e.g. the leading edge as defined by the direction of rotation of the fan blades) moves said circumferential end towards the annular casing member.

The tilting arrangement may be provided between a gas washed surface of the fan track liner and the annular casing member. The tilting arrangement may be integrally provided with the fan track liner.

The tilting arrangement may comprise a deformable member configured to deform to initiate tilting of an associated liner panel in the event that said liner panel is impacted by a released fan blade.

The tilting arrangement may comprise a plurality of deformable members, each deformable member being associated with one of the liner panels.

The deformable member may have a differential stiffness. The deformable member may be arranged such that a portion of the deformable member proximal to a trailing edge of the fan track liner panel is stiffer than a portion of the deformable member proximal a leading edge of the fan track liner panel, e.g. before activation of the tilting arrangement.

In the present application the leading edge and trailing edge of the liner panels are defined with respect to the direction of rotation of the fan.

The deformable member may comprise an elongate member that is curved in a radial direction. The deformable member may be considered to undulate in the radial direction.

The deformable member may include a first radially curved portion proximal to the trailing edge of the liner panel and a second radially curved portion proximal to the leading edge of the liner. The second radially curved portion may have a greater pitch than the first radially curved portion.

The pitch of the second radially curved portion may be twice the pitch of the first radially curved portion. For example, the deformable member may include two curved regions.

The amplitude of the first radially curved portion and the second radially curved portion may be substantially equal.

The deformable member may be constrained such that in the event of a fan blade impacting the respective liner panel the second radially curved portion is deformed so as increase in radius of curvature and/or to flatten out. A section of the deformable member previously forming part of the second radially curved portion may move to form part of the first radially curved portion. In this way the stiffness of the first radially curved portion can be increased and the distance of protrusion of the trailing edge of the panel into the path of the fan blades can be increased.

The deformable member may be a metallic member. The deformable member may be an elongate strip.

The deformable member may be constrained by two support members. A first support member may be provided in a region of the first radially curved portion and a second support member may be provided in a region between the first radially curved portion and the second radially curved portion.

The first support may be provided in a region of a turning point of the first curved portion. The second support may be provided at a transition between the first radially curved portion and the second radially curved portion.

The supports may be arranged to support radially opposed surfaces of the deformable member. The first support may be arranged to support a surface of the deformable member that is nearest to a gas washed surface of the fan track liner. The first support may be arranged to define a minimum radial distance between the deformable member and the gas washed surface of the fan track liner. The second support may be arranged to support a surface of the deformable member nearest to the annular casing member. The second support may be arranged to maintain a region where the deformable member is spaced from the annular casing member. The second support may be arranged such that a change in length of the second radially curved portion transfers to the first radially curved portion.

The deformable member may comprise two undulations. One of the undulations may be proximal to the leading edge and the other undulation may be proximal to the trailing edge. A support may be provided in a region of the undulation proximal to the trailing edge. An additional support may be provided at a transition between the two undulations.

The deformable member may be embedded in the fan track liner panel. For example, the fan track liner panel may comprise a honeycomb layer and the deformable member may be embedded in said honeycomb layer.

In embodiments where supports are provided, the supports may be made from a honeycomb structure material. In embodiments where the deformable member is embedded in a honeycomb layer, the density of the material of the supports may be greater than the density of the material of honeycomb layer in which the deformable member is embedded.

The trailing edge of the liner may include one or more strengthening and/or severance members.

The fan track liner may be provided in three axial sections. A first axial section may be provided (in use) upstream of a path of fan blades. A second axial section may include the plurality of circumferentially adjacent liner panels and may be in a region of the path of the fan blades. A third axial section may be provided (in use) downstream of the path of the fan blades. The first and third sections may be acoustic panels. Additionally or alternatively, the third section may an ice impact panel.

The fan track liner may comprise an abradable layer forming a gas washed surface of the liner. The abradable layer may be provided on the second section. The first and third sections may be free from the abradable layer. The fan track liner may comprise a tray on which the abradable layer is provided. The fan track liner may comprise an intermediate layer (e.g. of honeycomb structure) provided between the tray and the annular casing element.

The annular casing member may be formed from a composite material having carbon fibre and/or glass fibre embedded in a resin matrix. Alternatively, the annular casing member may be made from a metallic material.

According to a second aspect there is provided a fan casing assembly positionable around a fan having a plurality of blades. The assembly comprises an annular casing member for circumferentially surrounding a fan, and an annular fan track liner comprising a plurality of circumferentially adjacent liner panels, positioned radially inward of the annular casing member. A plurality of deformable members are provided, each deformable member is associated with a liner panel and provided between the annular casing member and a gas washed surface of said liner panel. The deformable members are configured to deform to selectively circumferentially tilt the associated liner panel.

The skilled person will appreciate that except where mutually exclusive, a feature described in relation to the assembly of the first aspect may be applied mutatis mutandis to the assembly of the second aspect.

According to a third aspect there is provided a gas turbine engine comprising a fan having a plurality of blades arranged around a hub. The assembly according to the first or second aspect surrounds the fan.

The fan blades may be composite fan blades.

According to a fourth aspect there is provided a method of trimming blades of a fan of the gas turbine engine according to the third aspect in the event of a fan blade being released from the fan. The method comprises circumferentially tilting one or more of the liner panels such that the one or more tilted liner panels trim the tips of one or more of the fan blades.

DESCRIPTION OF THE DRAWINGS

Embodiments of the invention will now be described by way of example only, with reference to the Figures, in which:

FIG. 3 is a sectional view of the fan track liner of FIG. 2 through the section A-A indicated in FIG. 2 during normal operation of the gas turbine engine;

FIG. 4 is a sectional view of the fan track liner of FIG. 2 through the section A-A indicated in FIG. 2 in the event of a fan blade being released from the remainder of a fan of a gas turbine engine.

DETAILED DESCRIPTION

Figure 1:
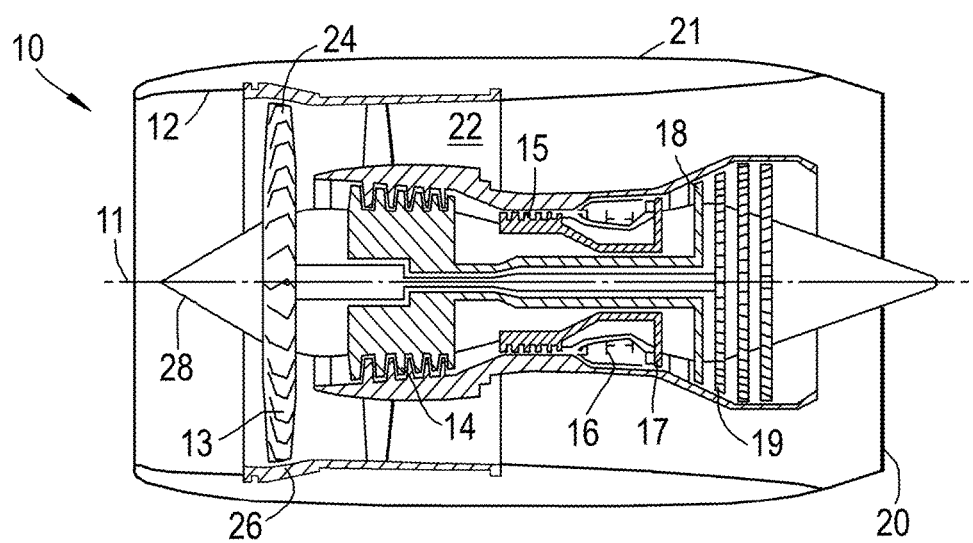
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, and intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

The fan 13 includes a plurality of blades 24 arranged around a hub, for example mounted to the hub. A fan casing assembly 26 surrounds the fan 13. In the engine shown in FIG. 1, the fan casing assembly extends axially upstream of the fan 13, but does not extend as far as the tip of the nose cone 28. However, in alternatively embodiments the fan casing assembly may extend further upstream than that shown in FIG. 1 and in some embodiments may extend to a position near or past the tip of the nose cone.

Figure 2:
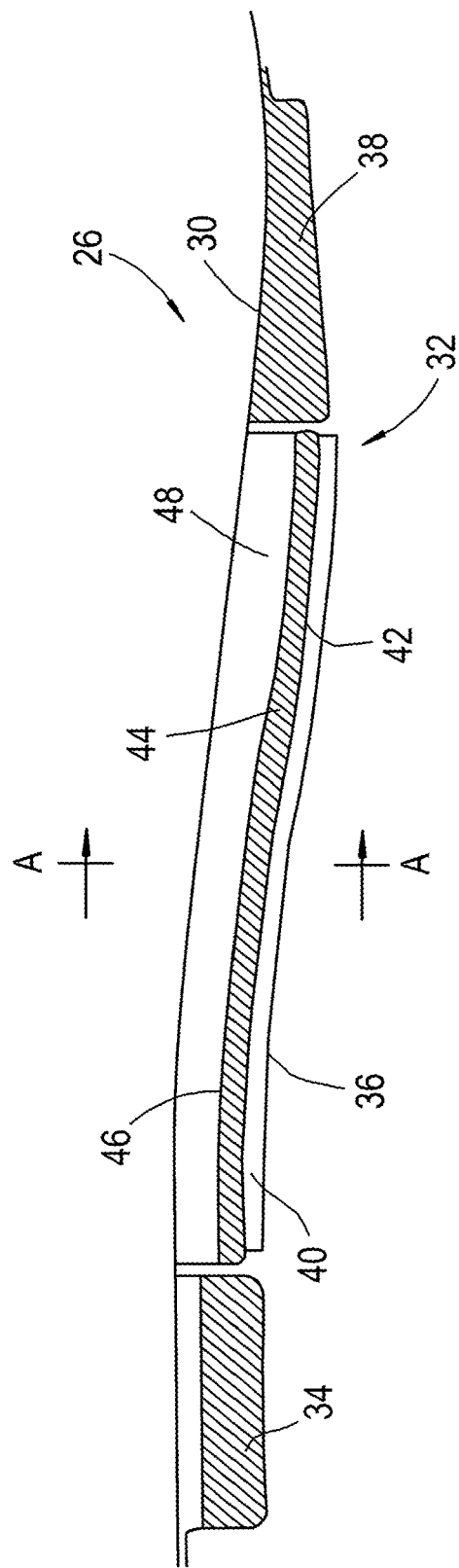
FIG. 2 is a sectional side view of a fan track liner.

Referring now to FIGS. 2, 3 and 4, the fan casing assembly will be described in more detail. The fan casing assembly includes an annular casing member 30 that surrounds the fan blades 24. An annular fan track liner 32 is provided radially inward of the casing member 30. The liner 32 is provided in three axially adjacent parts; a first part 34, a second part 36 and a third part 38. The first part is positioned upstream of the second part and the second part is positioned upstream of the third part. In the present application reference to upstream and downstream refers to the axial flow of air through the case turbine engine 10. In the present example the first and third parts include a glass fibre reinforced plastic (GFRP) and/or carbon fibre tray, a high density layer e.g. of honeycomb construction, and optionally a low density layer e.g. of honeycomb construction. The first and third parts may be formed a single annular component or from two or more panels.

The second part includes a plurality of panels 33a, 33b, 33c positioned circumferentially adjacent each other so as to form an annulus. Each panel includes an abradable layer 40 defining a gas washed surface of the fan track liner and positioned in use proximal to the fan blades. The abradable layer is provided on a tray 42 that in this example is made from GFRP. An intermediate layer is provided in the tray on an opposite surface to the abradable layer and between the tray and the casing member 30. The intermediate layer includes a first layer 44 and a second layer 48, the first layer having a higher density than the second layer and being positioned furthest from the annular casing member. In the present example, both the first layer and the second layer of the intermediate layer are of honeycomb construction. A septum layer 46 is provided between the first and second layer and in this example is formed from GFRP.

Referring now in particular to FIGS. 3 and 4, the fan casing assembly includes a tilting arrangement that can selectively tilt one or more of the liner panels in the event of a fan blade being released from a fan, so as to trim one or more of the remaining fan blades. The tilting arrangement will now be described in more detail.

A deformable member 50 is provided in each panel 33a, 33b, 33c of the second axial part of the fan track liner. The deformable member 50 is embedded in the lower density second layer 48 of the intermediate layer. In the present example, the deformable member is a metallic member of plate or strip form. The deformable member is curved in the radial direction. In the present example the deformable member includes two portions of different curvature; a first curved portion proximal to the trailing edge 58 of the panel 33b and a second curved portion proximal to the leading edge 56 of the panel 33b. The pitch of the second curved portion is greater than the pitch of the first curved portion. In this example the pitch of the second curved portion is twice that of the first curved portion, as indicated by arrows labeled x and 2x. The difference in pitch of the first and second curved portions results in the first portion being relatively stiffer than the second portion.

The deformable member 50 is curved such that the deformable member is nearest the gas washed surface of the liner panel 33b at the leading edge and trailing edge of the liner panel and in a region of transition between the first curved portion and the second curved portion.

The deformable member 50 is constrained by support members provided in the fan track liner. In this example two support members 52, 54 are provided, and are made from a honeycomb structure having a higher density than the second layer of the intermediate layer, in this way the supports may be stiffer than the remainder of the second layer of the intermediate layer.

One of the support members 54 is provided in a region of transition between the first curved portion and the second curved portion of the deformable member 50, and is provided proximal to the annular casing member 30. The other support member 52 is provided in a region of the first portion of the deformable member at a position corresponding to a region where the deformable member is nearest to the annular casing member 30. The other support 52 is provided proximal to the first higher density layer 44 of the intermediate layer. The support members support opposing radial sides of the deformable member.

Operation of the tilting arrangement and movement of the fan track liner panel in the event of a fan blade being released from the fan will now be described with particular reference to FIG. 4.

During normal operation of the gas turbine engine, the blades of the fan rotate in a direction indicated by arrow R. During normal operation the interaction of the blades with the fan track liner panel are minimal, for example the only interaction may be some rubbing of the blade tip into the abradable layer 40 of the liner.

In the event of a fan blade being released from the remainder of the fan, the blade will impact one or more panels 33a, 33b, 33c of the fan track liner. If, the released blade impacts a liner panel towards the leading edge 56 of said panel the force of the released blade impacting the liner panel causes the second portion of the deformable member to have in increased radius of curvature, and in this example to flatten out. This causes the leading edge 56 of the liner panel to move towards the annular casing element, as indicated by arrow A. If initial contact is made towards the trailing edge of the liner panel, the first support 52 aims to minimise any decrease in distance between the gas washed surface of the fan track liner panel and the casing (or deformable member).

The deformable member 50 is constrained at the leading and trailing edge of the panel, which means that deformation of the second portion results in a portion of the deformable member moving towards the first portion of the deformable member, as indicated by arrow B. The increase in length of the deformable member in a region of the first portion of the deformable member increases the radial stiffness of the first portion and causes the first portion of the deformable member to push against the casing member 30 as indicated by arrow C. The deformation of the first portion results in the trailing edge 58 of the liner panel moving away from the casing member 30 and towards the fan blades, as indicated by arrow D. That is, the panel tilts circumferentially. The trailing edge will typically be arranged to deflect by about 5 to 12 mm.

It is likely that multiple panels will be tilted in the way described above when a fan blade is released from the remainder of the fan.

The trailing edge of the tilted panels will trim the tips of the remaining fan blades in the rotor assembly to reduce out of balance forces.

The described method of addressing out of balance is beneficial compared to the methods of the prior art at least because the described method addresses out of balance early, that is before the rotor orbit increases. This means that the loads generated from the out of balance can be reduced.

Using the described arrangement to trim the blades can have the advantages of reducing the out of balance load of the LP shaft set (including fan and LP turbine), reducing engine drag; reducing the fan windmill forcing and so reducing fan rotational activity; improving aircraft handling; and reducing engine vibration.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The fan track liner has been described as being provided with three axially adjacent parts, but in alternative embodiments the fan track liner may comprise only a single part in the axial direction or may be made of two or four or more parts.

In alternative embodiments a reinforcement member and/or a serration member may be provided on the trailing edge 58 of the liner panel, and may be arranged such that the member is only exposed to the blade tip when the respective panel is tilted. For example, the trailing edge of the panel may be slotted and a trailing edge of the deformable member may be castellated. The deformable member may be arranged such that the trailing edge can be driven through the slots of the panel so as to enhance blade tip removal.

In alternative embodiments, the tilting mechanism provided may differ from the described arrangement. For example, the panel may be provided with a single support about which the panel can pivot. Impact of the blade with the panel may cause the panel to tilt and a latching arrangement may be activated to maintain the panel in a tilted position so as to trim the blade tips. In such an arrangement, a support may be provided to resist movement of the trailing edge of a panel towards the casing member if said panel is impacted by a released blade.

The invention claimed is:

1. A fan casing assembly positionable around a fan having a plurality of blades, the fan being for a gas turbine engine, the assembly comprising:
   an annular casing member for circumferentially surrounding a fan;
   an annular fan track liner comprising a plurality of circumferentially adjacent liner panels, and positioned radially inward of the annular casing member; and
   a tilting arrangement configured to selectively circumferentially tilt one or more of the liner panels, such that, in the event of a fan blade being released from a fan, the tilting arrangement can initiate tilting of one or more liner panels so that the liner panels can trim one or more of the remaining fan blades.

2. The assembly according to claim 1, wherein the tilting arrangement is configured such that a fan blade impacting one circumferential end of the liner panel moves said circumferential end towards the annular casing member.

3. The assembly according to claim 1, wherein the tilting arrangement comprises a deformable member configured to deform to initiate tilting of an associated liner panel in the event that said liner panel is impacted by a released fan blade.

4. The assembly according to claim 3, wherein the deformable member has a differential stiffness and is arranged such that a portion of the deformable member proximal to a trailing edge of the fan track liner panel is stiffer than a portion of the deformable member proximal a leading edge of the fan track liner panel, before activation of the tilting arrangement.

5. The assembly according to claim 3, wherein the deformable member comprises an elongate member that is curved in a radial direction.

6. The assembly according to claim 5, wherein the deformable member includes a first radially curved portion proximal to the trailing edge of the liner panel and a second radially curved portion proximal to the leading edge of the liner, the second radially curved portion having a greater pitch than the first radially curved portion.

7. The assembly according to claim 6, wherein the deformable member is constrained such that in the event of a fan blade impacting the respective liner panel the second radially curved portion is deformed so as increase in radius of curvature and/or to flatten out.

8. The assembly according to claim 6, wherein the deformable member is constrained by two support members, and wherein a first support member is provided in a region of the first radially curved portion and a second support member is provided in a region between the first radially curved portion and the second radially curved portion.

9. The assembly according to claim 3, wherein the deformable member is embedded in the fan track liner panel.

10. The assembly according to claim 1, wherein the fan track liner is provided in three axial sections, a first axial section that in use is upstream of a path of fan blades, a second axial section that includes the plurality of circumferentially adjacent liner panels and is in a region of the path of the fan blades, and a third axial section that in use is downstream of the path of the fan blades.

11. The assembly according to claim 1, wherein the fan track liner comprises an abradable layer forming a gas washed surface of the liner, a tray on which the abradable layer is provided, and an intermediate layer provided between the tray and the annular casing element.

12. The assembly according to claim 1, wherein the annular casing member is formed from a composite material having carbon fibre embedded in a resin matrix.

13. A method of trimming blades of a fan of the gas turbine engine, the gas turbine engine comprising a fan having a plurality of blades arranged around a hub; and the assembly according to claim 1 surrounds the fan, and the method comprising:
  circumferentially tilting one or more of the liner panels such that the one or more tilted liner panels trim the tips of one or more of the fan blades.

14. A fan casing assembly positionable around a fan having a plurality of blades, the assembly comprising:
  an annular casing member for circumferentially surrounding a fan;
  an annular fan track liner comprising a plurality of circumferentially adjacent liner panels, positioned radially inward of the annular casing member; and
  a plurality of deformable members, each deformable member being associated with a liner panel and provided between the annular casing member and a gas washed surface of said liner panel, the deformable members being configured to deform to selectively circumferentially tilt the associated liner panel.

* * * * *